United States Patent [19]

Hirshik

[11] Patent Number: 5,757,361
[45] Date of Patent: May 26, 1998

[54] METHOD AND APPARATUS IN COMPUTER SYSTEMS TO SELECTIVELY MAP TABLET INPUT DEVICES USING A VIRTUAL BOUNDARY

[75] Inventor: Andrew S. Hirshik, N. Salem, N.Y.

[73] Assignee: International Business Machines Corporation, Armonk, N.Y.

[21] Appl. No.: 618,910

[22] Filed: Mar. 20, 1996

[51] Int. Cl.[6] .................. G09G 3/02; G08C 21/00
[52] U.S. Cl. .................. 345/156; 345/157; 345/340; 345/339; 345/342; 178/18; 178/19
[58] Field of Search .................. 178/18, 19; 345/118, 345/145, 156, 157, 158, 173, 179, 340, 342, 339, 435; 395/340, 342, 339, 135

[56] References Cited

U.S. PATENT DOCUMENTS

| | | |
|---|---|---|
| 4,720,703 | 1/1988 | Schnarel, Jr. et al. |
| 5,097,102 | 3/1992 | Yoshimura et al. |
| 5,146,049 | 9/1992 | Shima. |
| 5,164,713 | 11/1992 | Bain ............................. 345/157 |
| 5,177,328 | 1/1993 | Ito et al. |
| 5,196,838 | 3/1993 | Meier et al. ..................... 340/724 |
| 5,297,254 | 3/1994 | Arai et al. ....................... 345/179 |
| 5,327,161 | 7/1994 | Logan et al. ..................... 345/173 |
| 5,483,261 | 1/1996 | Yasutake .......................... 345/158 |

FOREIGN PATENT DOCUMENTS

| | | |
|---|---|---|
| 06230888 | 8/1994 | Japan. |
| 07072976 | 3/1995 | Japan. |
| WO9119245 | 12/1991 | WIPO. |

OTHER PUBLICATIONS

IBM Technical Disclosure Bulletin, vol. 31, No. 12, May 1989 "Braille Computer Mouse with Tactile Position Feedback".

*Primary Examiner*—Steven J. Saras
*Assistant Examiner*—Vijay Shankar
*Attorney, Agent, or Firm*—Mark S. Walker; John G. Graham; Andrew J. Dillon

[57] ABSTRACT

An improved method and apparatus in pen-based computer systems using a tablet input device to select the outer boundary area of a graphics display through use of a virtual cursory boundary is disclosed. The tablet input device has a first inner active area surrounded by a second outer active boundary. An operator selectively moving a pointing device in the first inner active area of the tablet input device causes a cursor to move correspondingly on the graphics display image. When the operator selectively moves the pointing device in the second outer active area, the digitizing table causes the cursor to move to a corresponding graphics display boundary position.

10 Claims, 5 Drawing Sheets

METHOD AND APPARATUS IN COMPUTER SYSTEMS TO SELECTIVELY MAP TABLET INPUT DEVICES USING A VIRTUAL BOUNDARY

BACKGROUND OF THE INVENTION

1. Technical Field

This present invention generally relates to the field of computer systems and more particularly to the method and apparatus for inputting user information including data and commands through the use of a pen-based input device.

2. Description of the Related Art

In computer systems, the use of pen-based input devices as an alternative to the mouse and keyboard continues to grow. These pen-based input devices fall into two broad categories defined by the type of tablet input device employed. The first type of tablet input device is depicted in FIG. 1. The tablet input device is a transparent overlay that sits on top of the graphics display so that the graphics display image is viewable through the tablet. The active area of the tablet input device 3 correspondingly maps to the graphics display area 5. This type of tablet is awkward to use and is now disfavored in the industry. The second type of tablet input device is depicted by FIG. 2. This digitizing table is an opaque tablet that sits off to the side of the graphics display. Similarly to the first transparent overlay tablet input device of FIG. 1, the active area of the tablet 3 of FIG. 2 corresponds to the graphics display area 5.

During typical operation, the user moves a pen over the opaque tablet input device to cause the corresponding movement of the cursor across the graphics display. Just as when using a mouse, trackball or other pointing device, the user is able to concentrate on the task at hand by focusing on the graphics display without knowing the location of the pointing device. With proper eye-hand coordination, the user is quickly able to complete the task. The user's productivity, however, is reduced if the user must inadvertently break concentration by shifting focus between the graphics display and the pointing device. It is therefore very desirable and, furthermore, results in the highest productivity if the user can completely focus on the graphics display while relying on eye-hand coordination to move the cursor across the screen through hand movements of the pointing device.

This identical eye-hand coordination between the cursor on the graphics display and the hand movement of pointing devices is accomplished when using a pen-based system. Gestures with the pen on a tablet produces comparable actions the user would accomplish when using a mouse. As an example, an upward flick of the pen on the tablet scrolls the image on the graphics display. Another example is the tapping of the pen on the digitizer tablet which is equivalent to depressing a mouse button.

Taking this example further, a quick double tap with the pen results in the same action as if the user quickly depressed the left mouse button twice.

There is one distinct difference, however, between a mouse or trackball versus a pen on a tablet. The pen on a tablet has a finite limited active area as defined by the size of the tablet. On the other hand, the mouse operates on any size surface simply by picking it up and repositioning it, and the trackball operates without any limitation of active area whatsoever. This limited active area poses a special situation when using a pen with a tablet. If the user inadvertently overshoots the tablet, any gesture with the pen such as an upward flick or tapping of the pen will not result in an action. In that case, the user's input would be ignored. This overshooting of the active area of the tablet causes the user to break concentration on the graphics display and momentarily switch focus on the pen to inspect that it is indeed returned to the active area of the tablet. This type of overshooting is especially troublesome when the user desires to select the outer boundary area of the graphics display area such as the "Minimize Button" located on the tool bar of a maximized window under a popular graphically oriented operating system such as IBM's OS/2, Microsoft's Windows, or Apple's System 7. The user must often "hunt and peck" to achieve the desire action. This is both frustrating and unproductive.

Accordingly, what is needed is an improved method and apparatus in pen-based computer systems to bound cursor movements selectively, particularly at the outer boundary area of graphics displays, through use of a tablet input device with a virtual cursor boundary.

The following documents relate to various methods and apparatus in pen-based computer systems to work with the outer boundary area of graphics displays.

U.S. Pat. No. 5,177,328 issued Jan. 5, 1993, to Ito et al. for "Information Processing Apparatus" discloses a transparent overlay tablet input device whose active area extends beyond the area of the graphics display. The area extending beyond the graphics display area is used to select predetermined system processes.

U.S. Pat. No. 5,146,049 issued Sep. 8, 1992, to Shima for "Method And System For Inputting Coordinates Using Digitizer" teaches an opaque digitizing tablet with an area whose digitizing resolution is greater than or equal to correspondingly relocatable mapped area of a graphics display.

U.S. Pat. No. 5,289,168 issued Feb. 22, 1994, to Freeman for "Image Handling Apparatus And Controller For Selecting Display Mode" discloses an opaque tablet whose active area extends beyond the defining area of the graphics display. Movement of a pen on the active area of the tablet that extends beyond the defining area of the graphics display changes the manner in which the image is displayed, e.g., scroll, zoom, etc.

U.S. Pat. No. 4,720,703 issued Jan. 19, 1988, to Schnarel, Jr. et al. for "Display Method And Apparatus Employing Cursor Panning" teaches a graphics display system whose viewable screen information area can be panned with the cursor. When the viewable screen information area is panned outside the graphics display's viewable area, the cursor is included in this panned space.

SUMMARY

According to the present invention, an improved method and apparatus in pen-based computer systems using a tablet input device to select the outer boundary area of a graphics display through use of a virtual cursory boundary is disclosed. The tablet input device has a first inner active area surrounded by a second outer active boundary. An operator selectively moving a pointing device in the first inner active area of the tablet input device causes a cursor to move correspondingly on the graphics display image. When the operator selectively moves the pointing device in the second outer active area, the digitizing table causes the cursor to move to a corresponding graphics display boundary position.

In one specific embodiment, an information processing apparatus is disclosed that includes a display device for displaying images in a display area, a tablet input device coupled to the display device, and having a first interpointing area enclosed by a second outerpointing area, and a pointing device coupled to the tablet input device for selecting a user direct positions for either the first interpointing area or the second outerpointing area. Further, the system includes a display controller, coupled to the display device and the digitizer, that controls display information on the display device so that the first interpointing area maps into an interdisplay area on the display device and the second outerpointing area maps into an outerdisplay boundary on the display device. Typically, the display area and boundaries are rectangular with the tablet input device being a pen. Further, the display controller also maps a plurality of active pointer corners, defined at the corners of the tablet input device, that are mapped by the display controller from the tablet input device to the viewing area on the display device.

It is therefore one object of the present invention to provide a pen-based computer system.

It is another object of the present invention to provide the method and apparatus for inputting user information including data and commands through the use of a pen-based input device.

It is yet another object of the present invention to provide an improved method and apparatus in pen-based computer systems to selectively position the cursor inside the four corner areas of a rectangular graphics display.

Still another object of the present invention is to provide an improved method and apparatus in pen-based computer systems to bound cursor movements selectively, in particular at the outer boundary area of graphics displays, through use of a tablet input device with a virtual cursor boundary.

In order to achieve the above objects, a pen-based computer system is provided that includes a graphics display coupled to a digitizer tablet with a first inner pointing area and a second outer pointing area. The graphics display comprises a display area surrounded by a display boundary. A user-directed pointing device coupled to the digitizer tablet has selective movement between the first inner pointing area and the second outer pointing area. The computer system includes a controller coupled to the graphics display so as to (1) move the cursor within the graphics display area when the user directs the pointing device into the first inner pointing area and (2) move the cursor along the graphics display boundary when the user directs the pointing device into the second outer pointing area.

In order to achieve the advantages of the present invention, the digitizer tablet contains two distinct pointing areas: the inner pointing area and the outer pointing area. As such, the inclusion of two distinct pointing areas on the digitizer tablet according to the present invention overcomes the disadvantages in the prior art of overshooting the tablet and enabling easier user selection of the graphic display's outer boundaries.

The foregoing and other objects, features, and advantages of the invention will be apparent from the following more particular description of the preferred embodiment of the invention as illustrated in the drawings.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects, and advantages thereof, will best be understood by reference to the following detailed description of an illustrative embodiment when read in conjunction with the accompanying drawings, wherein:

DETAILED DESCRIPTION OF SPECIFIC EMBODIMENTS

Figure 1:
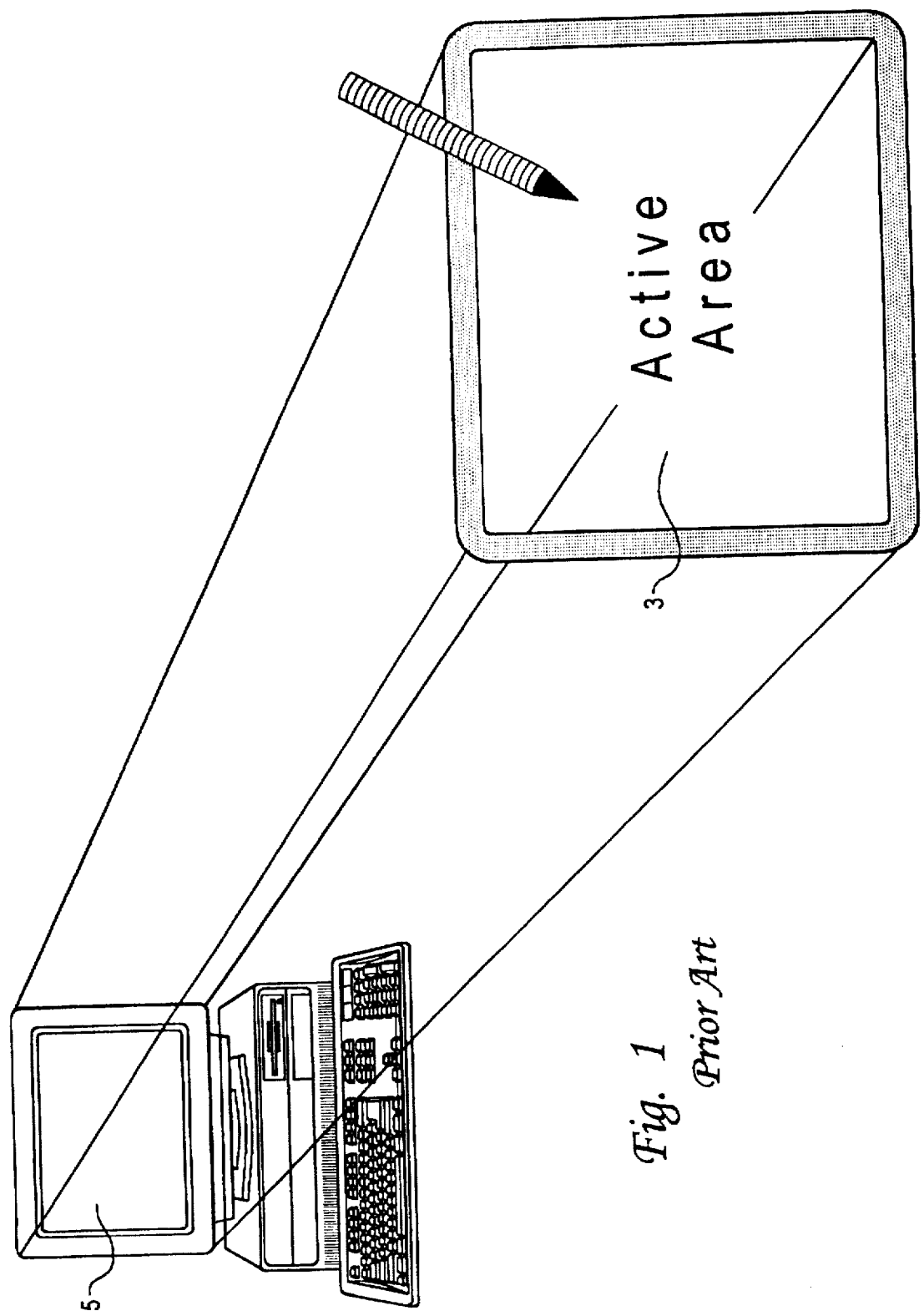
FIG. 1 is an elevational view of a typical prior-art pen-based computer assembly including a system unit, a graphics display, a transparent overlay type tablet input device and a pen.
Figure 2:
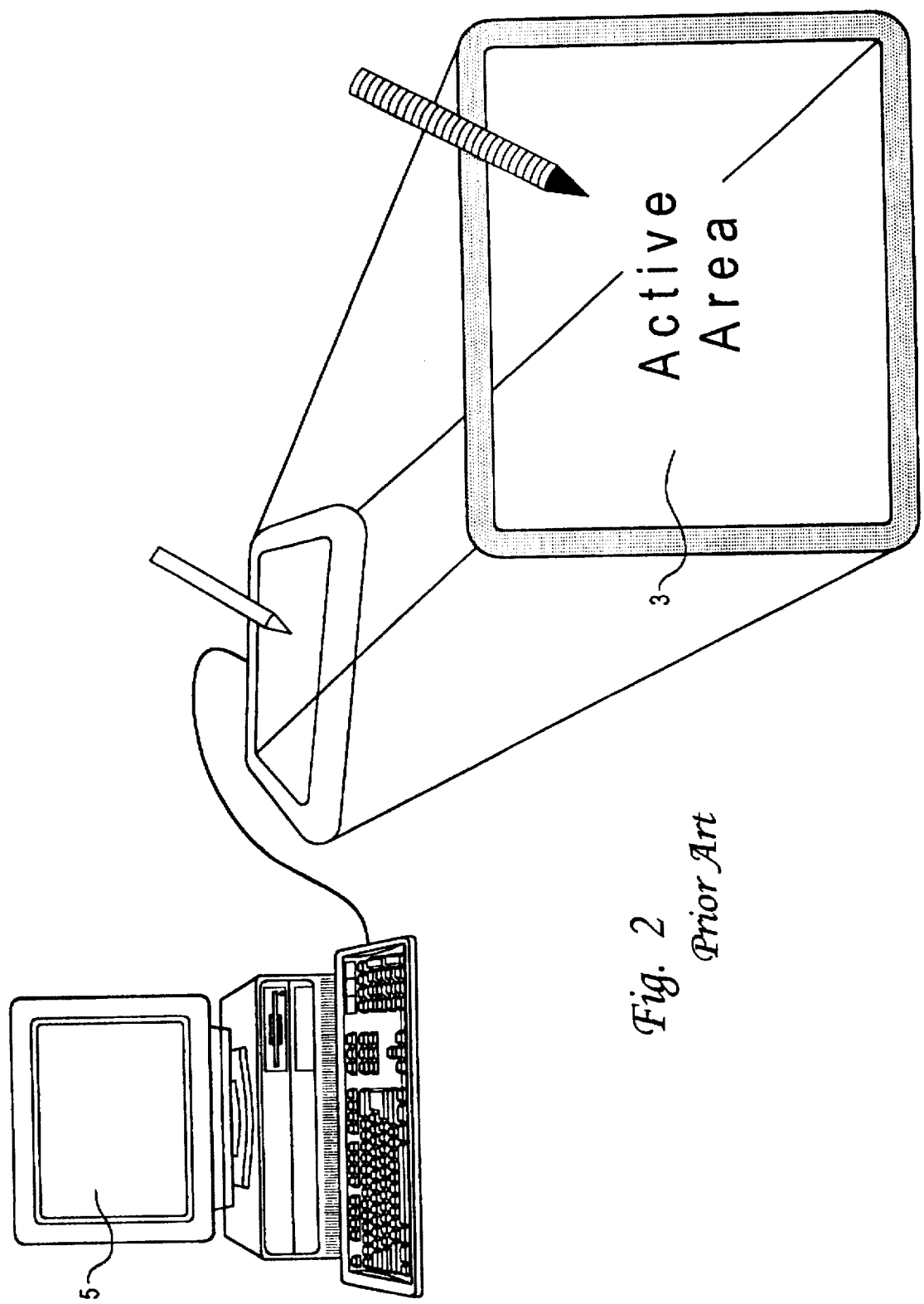
FIG. 2 is an elevational view of a typical prior-art pen-based computer assembly including a system unit, a graphics display, an opaque tablet input device and a pen.
Figure 3:
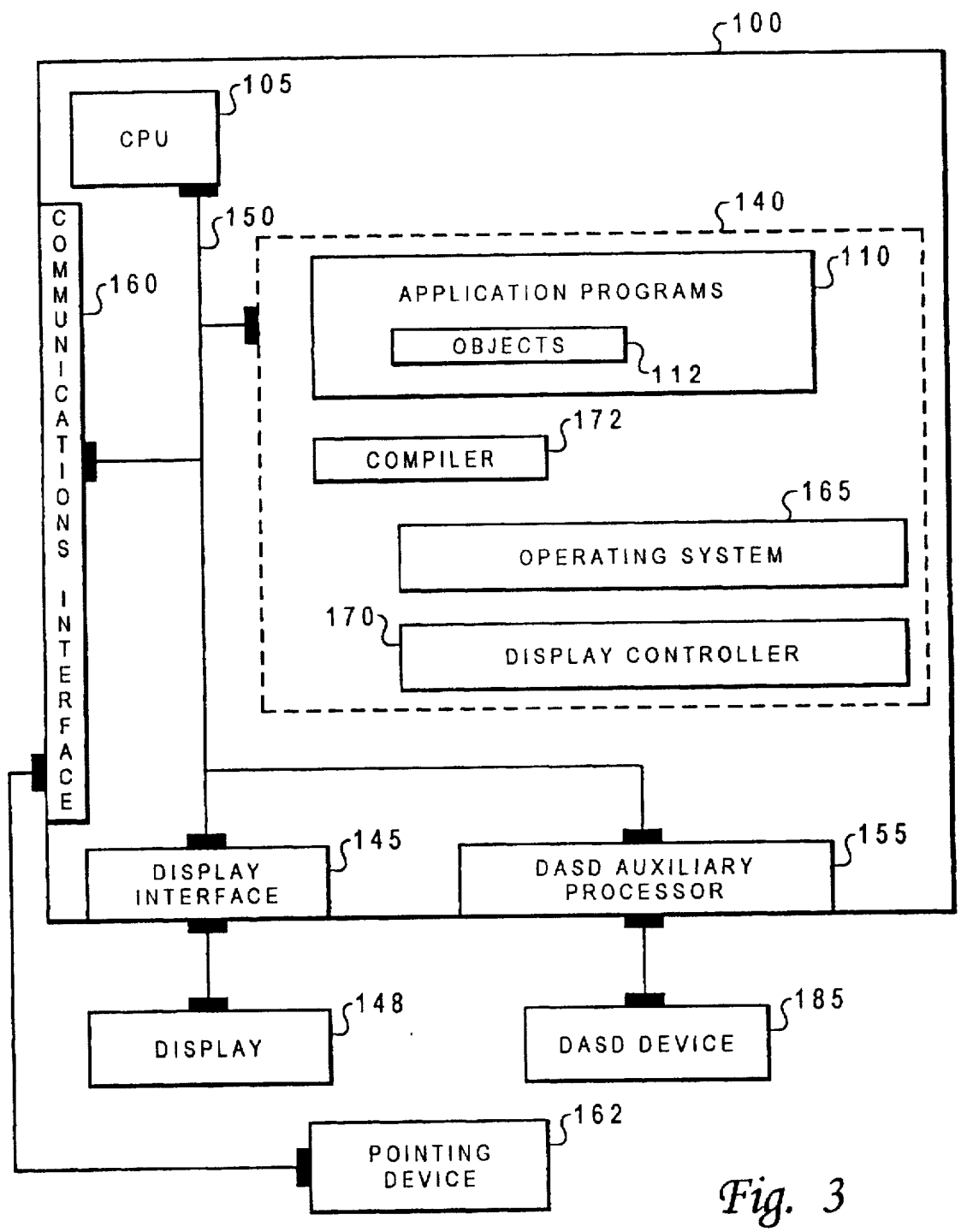
FIG. 3 depicts a block diagram of the computer system according to the present invention.

FIG. 3 shows a block diagram of the computer system of the present invention. The computer system of the preferred embodiment is an enhanced IBM Aptiva personal computer system. Those skilled in the art, however, will appreciate that the mechanisms and apparatus of the present invention apply equally to any computer system, regardless of whether the computer system is a complicated multiuser computing apparatus or a single-user workstation. As shown in the exploded view of FIG. 3, computer system 100 comprises main or central processing unit (CPU) 105 connected to main memory 140, display interface 145, mass storage interface 155, and communication interface 160. These system components are interconnected through this use of system bus 150. Although computer system 100 is shown to contain only a single main CPU and a single system bus, it should be understood that the present invention applies equally to computer systems that have multiple CPUs and to computer systems that have multiple busses and that each perform different functions in different ways.

The interfaces, also known as input/output processors, that are used in the preferred embodiment each include separate, fully programmed microprocessors that are used to offload computer-intensive processing from CPU 105. Those skilled in the art, however, will appreciate that the present invention applies equally to computer systems that simply use IO adapters to perform similar functions. Display interface 145 is used to connect directly one or more terminals to computer system 100. These terminals, which may be nonintelligent or fully programmable workstations, are used to allow system administrators and computer programs to communicate with computer system 100. Communication interface 160 is used to connect other computer systems or workstations, or both, to computer system 100 in network fashion. The present invention is not limited to any one networking mechanism. Computer system 100 may be connected to other systems through the use of present-day analog or digital techniques, or both, or via some networking mechanism of the future. Communication interface 160 further provides communication connection with device 162, which may be, for example, a digitized tablet with pen or other type pointing device such as a trackball or mouse device. Further, communication interface 160 may also provide communications with other computer systems over the telephone lines and not just a networking configuration.

Mass storage interface such as DASD Auxiliary Processor 155 is used to connect mass storage devices, such as DASD device 185, to computer system 100.

Main memory 140 contains application programs 110, compiler 172 and operating system 165. While application programs 110 and operating system 165 are shown to reside in main memory 140, those skilled in the art will recognize that these entities are shown in this manner to represent the fact that programs are typically loaded from slower mass storage into faster main memory to execute. Depicting these programs in this manner should not be taken to mean that they are necessarily all completely contained in main memory 140 at the same time. It should also be noted that the term computer system memory is used herein to refer generically to the memory of the computer system as a whole (i.e., main memory 140 and that represented by DASD device 185). Those skilled in the art will further recognize that the programs shown in main memory 140 need not necessarily all reside on computer system 100. For example, one or more programs of application programs 110 may reside on another system and engage in cooperative processing with one or more programs that reside on computer system 100. This should be accomplished through the use of one of the well-known client-server mechanisms such as remote procedure call (RPC).

Compiler 172 is used to compile source code into executable code, as will be explained in the forthcoming paragraphs. Operating system 165 is a multitasking operating system known in the industry as OS/2 operating system; however, those skilled in the art will appreciate that the spirit and scope of the present invention is not limited to any one operating system.

It is important that while the present invention has been, and will continue to be, described in a context of a fully functional computer system, those skilled in the art will appreciate that the present invention is capable of being distributed as a program product via floppy disk, CD ROM, or other form of recordable media or via any type of electronic transmission mechanism, such as a modem.

Figure 4:
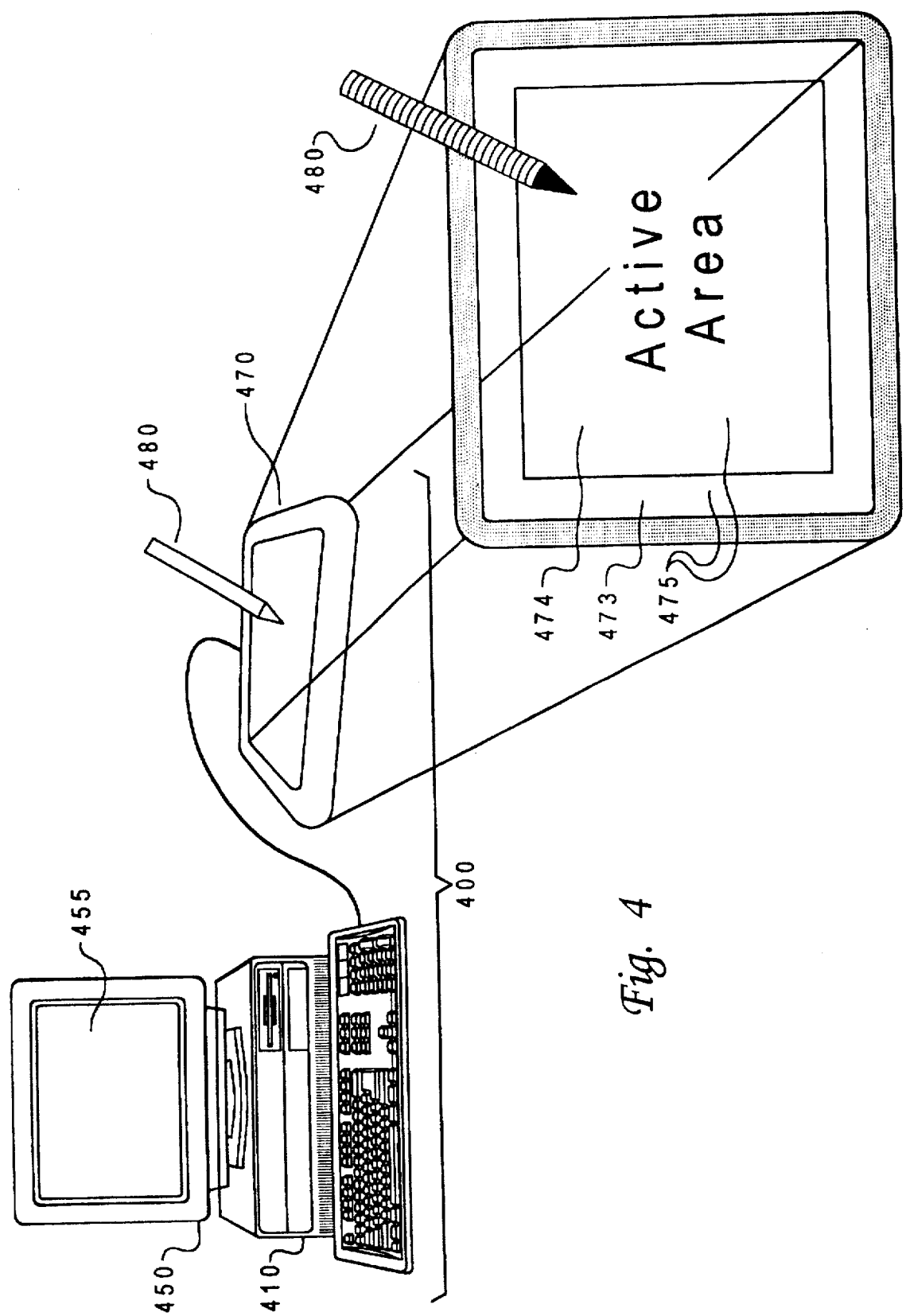
FIG. 4 is an elevational view of a pen-based computer assembly according to the present invention including a system unit, a graphics display, digitizing tablet input device with an inner active area and an outer active area and a pen.
Figure 5:
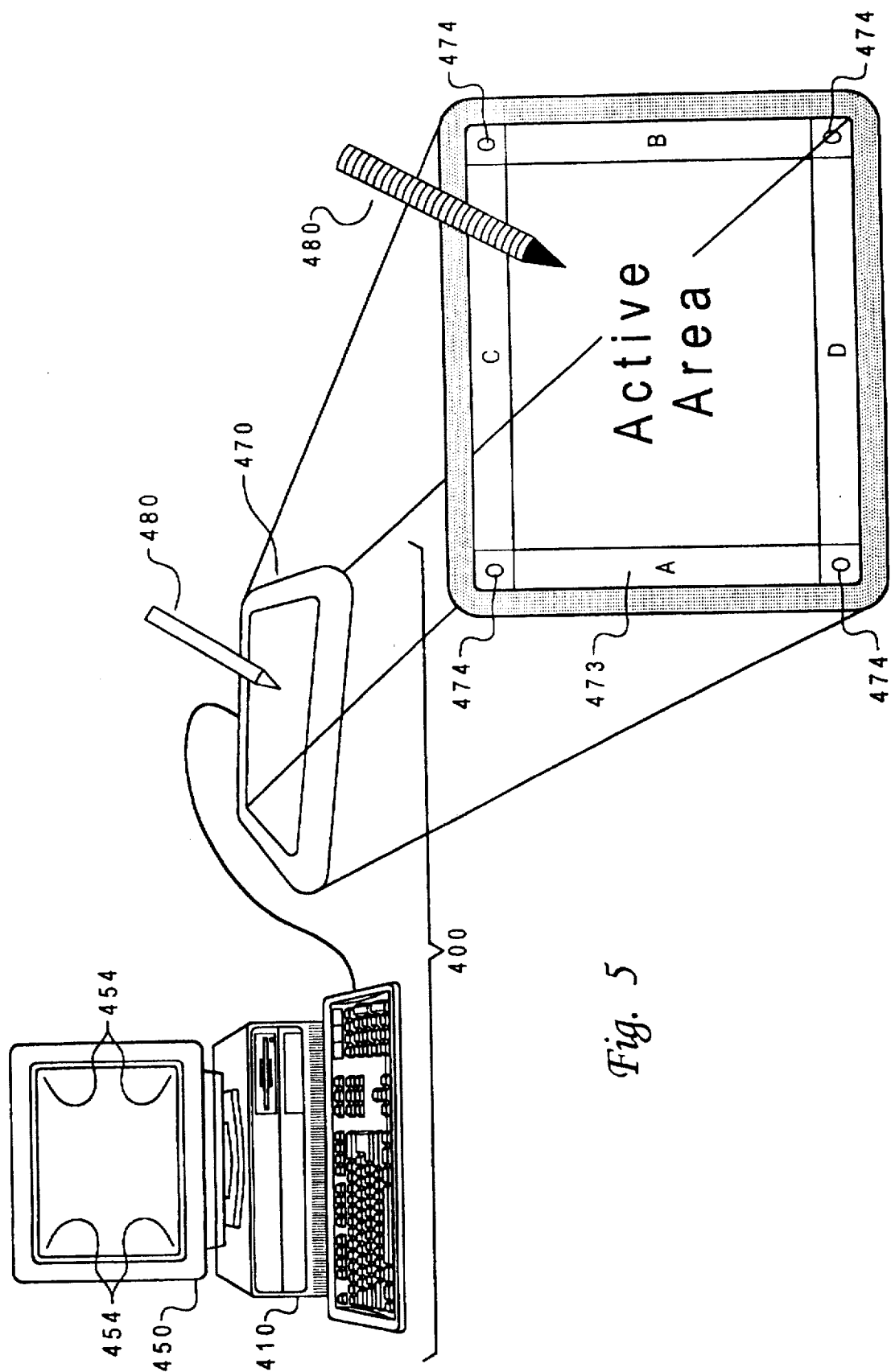
FIG. 5 is another embodiment of the opaque tablet input device according to the present invention with four distinct outer active corner boundary areas defined.

Further provided in the operating system is a display controller 170 that implements a virtual boundary for use with the pointing device 162, typically a digitizer tablet as shown in FIGS. 4 and 5. Display controller 170 defines the boundary by establishing an inner pointing area and an outer pointing area shown on the screen and the digitizing tablet of FIG. 4. These two pointing areas enable the user to select the outer boundaries of the graphic display as will be described in greater detail below.

Referring now to FIG. 4, depicted is a pen-based computer system 400 such as that described in FIG. 3, having a system unit 410, with an electrically connected graphics display 450 with viewable screen area 455. Graphics display can be any of the well-known types used in the industry that includes both Cathode Ray Tubes (CRT) and Liquid Crystal Display (LCD) technologies. An opaque tablet input device 470 is electrically connected to the system unit 410.

Opaque tablet input device comprises a plastic plate and a grid of X-electrodes and Y-electrodes extending along the X and Y axes respectively in the plastic plate. Opaque tablet input device 470 contains an active pointing area 475. Active pointing area 475 is comprised of inner active pointing area 472 surrounded by an outer active pointing area 473. A pointing-pen instrument 480 is electrically attached to opaque tablet input device 470. Movement of pointing-pen 480 is sensed by the grid of X-electrodes and Y-electrodes and is translated into cursor position on viewable screen area 455 of graphics display 450. It is important to particularly point out that other available tablet input device technologies are encompassed within the spirit of the present invention. These tablet technologies include light-based sensors such as infrared positioning, heat-based sensing positioning and LED-based pickups positioning. Still other pen-based positioning technologies contemplated include strain-based technologies, piezo electric positioning, and charge-based coupled positioning.

Continuing further, inner active pointing area 472 is electrically mapped to cursor position on viewable screen area 455 of graphics display 450 so that movement of pointing-pen 480 within inner active area 472 correspondingly moves a graphics cursor inside viewable screen area 455.

The outer active pointing area 473 is a border area approximately ¼" to ½" in width. The outer active pointing area 473 is electrically mapped to the boundary of viewable screen area 455 of graphics display 450, so that movement of pointing pen 480 within outer active pointing area 473 correspondingly moves a graphics cursor along the boundaries on viewable screen area 455 of graphics display 450. It is thereby possible for a user to select the outer viewable boundary of a viewable screen area 455 simply by movement of pointing-pen 480 within outer active pointing area 473. Even in the embodiment where outer viewable boundary is comprised solely of a single line of graphics pixels to form a very narrow outline, the user can readily select this outer viewable boundary 473 with a pointing-pen 480 movement within outer active pointing area 473. In this very narrow outline embodiment, a viewable single line along the screen's edge is correspondingly mapped into the outer active pointing area 473.

In still another embodiment, FIG. 5 illustrates a graphics display with viewable screen area 455. The viewable screen area incorporates a plurality of corner viewable boundaries 454. Outer active pointing area 473 of opaque tablet input device 470 contains a plurality of active pointing corners 474. Each of the active pointing corners 474 is correspondingly mapped to corner viewable boundaries 454 so that movement of pointing pen 480 within the active pointing corners 474 causes the graphics cursor to remain stationary at the corresponding corner viewable boundaries 454.

While the invention has been particularly shown and described with reference to a preferred embodiment, it will be understood by those skilled in the art that various changes in form and detail may be made therein without departing from the spirit and scope of the invention.

What is claimed is:

1. An information processing apparatus comprising:
    a display device for displaying images, the display device having a display area;
    a tablet input device coupled to said display device with a first inner pointing area surrounded by a second outer pointing area;
    a pointing device coupled to said tablet input device for selecting a user-directed position through either said first inner pointing area or said second outer pointing area;
    a display controller, coupled to said display device, that controls display information on said display device so that the first inner pointing area maps into a central area of said display area on said display device and said second outer pointing area maps into an outer display boundary of said display area on said display device.

2. The information processing apparatus of claim 1 wherein said display area and said display boundary are rectangular.

3. The information processing apparatus of claim 1 wherein said pointing device is a pen.

4. An information processing apparatus comprising:
- a display device that displays images within a display area;
- a tablet input device coupled to said display device with a first inner rectangular pointing area surrounded by a second outer rectangular pointing area having four sides, each of said four sides of said rectangular pointing area intersect to form corner pointing areas;
- a pointing device coupled to said tablet input device for selecting a user-directed position among said first inner pointing area, said second outer pointing area and said corner pointing areas;
- a display controller, coupled to said display device for controlling display information on said display device so that the first inner pointing area maps into a central area of said display area, said second outer pointing area maps into an outer display boundary of said display area, and said corner pointing areas map into corresponding corner display boundaries of said display area.

5. The information processing apparatus of claim 4 wherein said display area and said display boundary are rectangular.

6. The information processing apparatus of claim 4 wherein said pointing device is a pen.

7. A computer program product operable on an information processing apparatus having a display device for displaying images, said display device having a display area, a tablet input device coupled to said display device with a first inner pointing area surrounded by a second outer pointing area, a pointing device coupled to said tablet input device for selecting a user-directed position through either said first inner pointing area or said second outer pointing area, said computer program product comprising:
- a computer readable medium;
- computer usable code means, stored in said computer readable medium and executable on said information processing apparatus, for controlling display information on said display device so that said first inner pointing area maps into a central part of said display area and said second outer pointing area maps into an outer display boundary of said display area.

8. The computer program product of claim 7 wherein said display area and said outer display boundary are rectangular.

9. The computer program product of claim 7 wherein said pointing device is a pen.

10. The computer program product of claim 7 wherein a plurality of active pointer corners are mapped by said code means from said tablet input device to viewing corner boundaries on said display.

* * * * *